April 22, 1924.

G. W. PROUTY 1,491,421

BEAD CLOSING MECHANISM FOR TIRE WRAPPING MACHINES

Filed May 9, 1923    2 Sheets-Sheet 2

INVENTOR=
George W. Prouty
by Macleod, Calver, Copeland
Attys.

Patented Apr. 22, 1924.

1,491,421

UNITED STATES PATENT OFFICE.

GEORGE W. PROUTY, OF BOSTON, MASSACHUSETTS.

BEAD-CLOSING MECHANISM FOR TIRE-WRAPPING MACHINES.

Application filed May 9, 1923. Serial No. 637,654.

*To all whom it may concern:*

Be it known that I, GEORGE W. PROUTY, a citizen of the United States, residing at Boston, county of Suffolk, State of Massachusetts, have invented a certain new and useful Improvement in Bead-Closing Mechanism for Tire-Wrapping Machines, of which the following is a specification, reference being had therein to the accompanying drawings.

This invention relates to wrapping machines of the general type shown and described in my application for Letters Patent filed June 21, 1921, Serial No. 479,410, and adapted primarily for wrapping annular objects, such, for example, as automobile tires, coils of wire, etc.

The present invention has for its object to provide, in a machine for wrapping automobile tire shoes, mechanism for pressing together the beads of a shoe as it is wrapped so as to form a compact package, said means being automatically operated when the machine is started and automatically adjustable in accordance with the size of the shoe wrapped.

The foregoing and other objects of the invention, together with means whereby the same may be carried into effect, will best be understood from the following description of one form or embodiment thereof illustrated in the accompanying drawings. It will be understood, however, that the particular construction and arrangement described and shown have been chosen for illustrative purposes merely, and that the invention, as defined by the claims hereunto appended, may be otherwise practised without departure from its spirit and scope.

In said drawings:

Fig. 3 is a detail sectional view, taken substantially on line 3—3, Fig. 1, showing the bead closers and associated parts.

Figure 1:
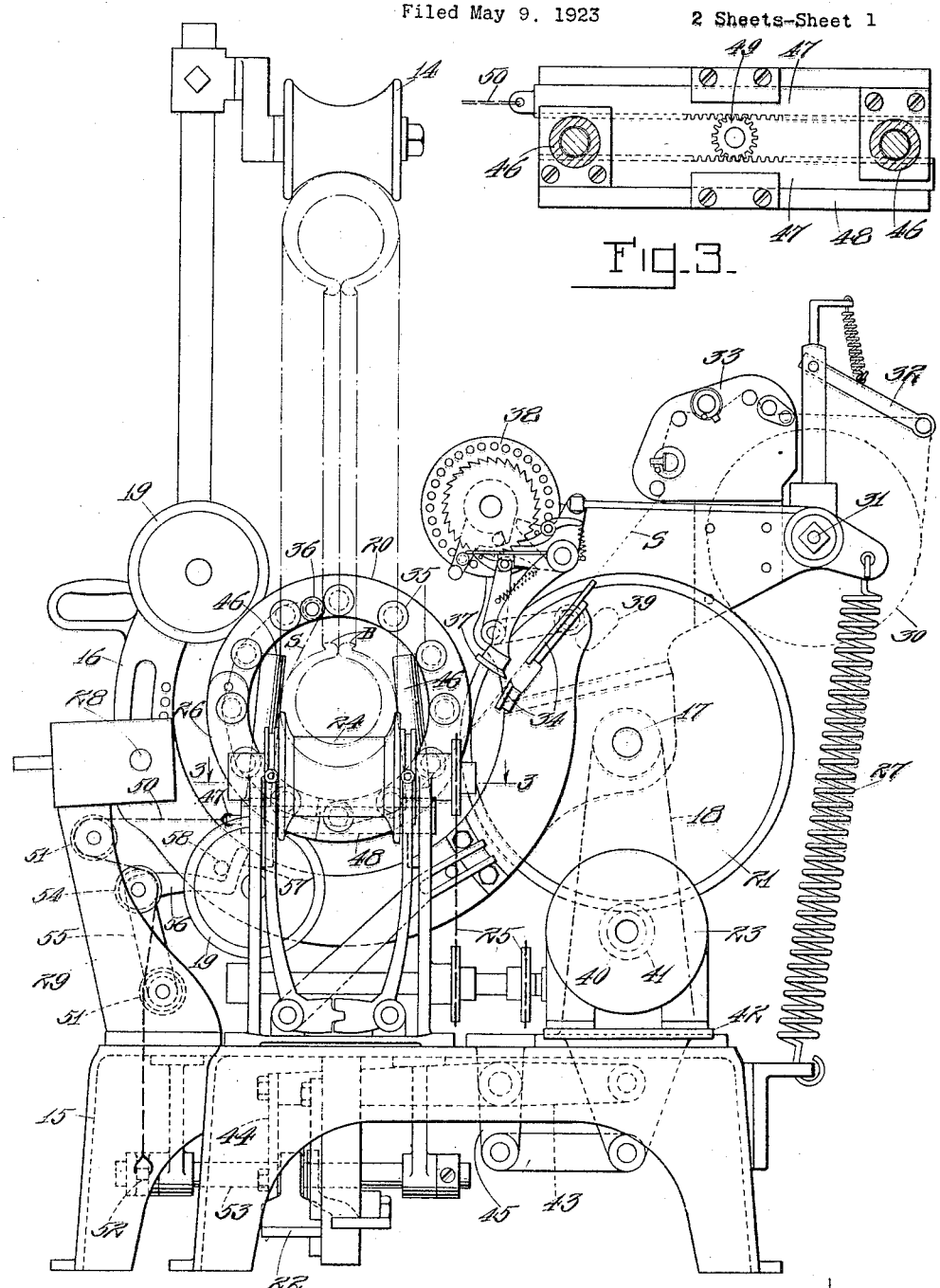
Fig. 1 is a front elevation of a tire wrapping machine including bead closing mechanism embodying the invention.
Figure 2:
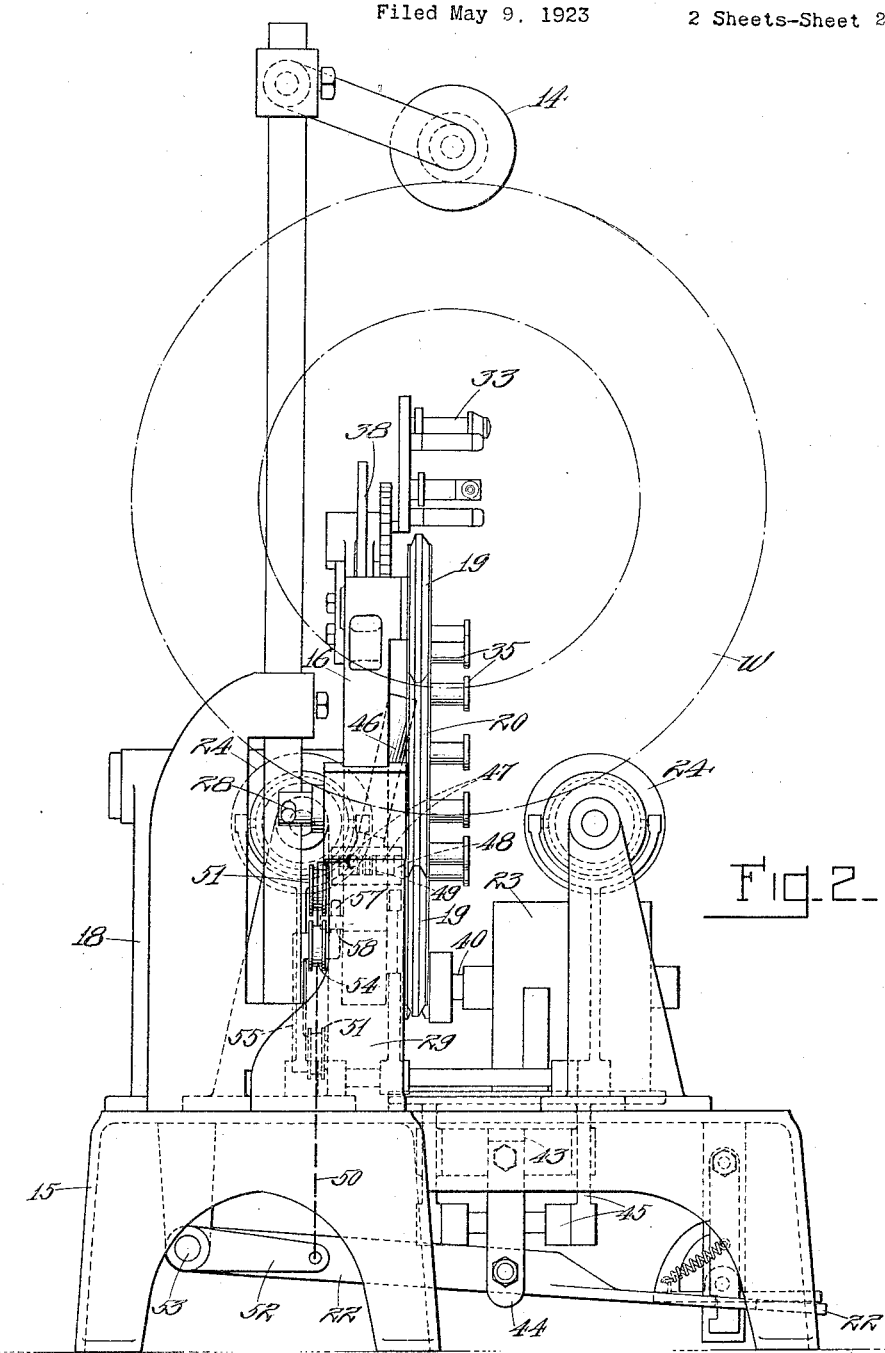
Fig. 2 is a side elevation thereof, looking from the left in Fig. 1.

The frame of the machine comprises a base 15 and a yoke 16 which is pivotally mounted on a shaft 17 journalled in an upright 18 rising from the base 15. The yoke 16 is provided with guide rollers 19 for an annular shuttle 20 which is rotated by a driving member in the form of a friction disk 21 secured to the shaft 17 and driven through connections hereinafter described under the control of a starting treadle 22 from an electric motor 23 supported on the base 15. The tire shoe W to be wrapped is held by a weighted roller 14 upon work supporting rollers 24 which are driven, through connections generally indicated at 25, from the motor 23, the arrangement being such that the work W will be turned relatively slowly with respect to the speed of rotation of the shuttle 20. Said shuttle is formed with a hinged segment 26 normally closing a gap through which the work W may be inserted, while the yoke 16 may be adjusted about the axis of the shaft 17 to center the shuttle 20 with respect to tire shoes of different sizes, said yoke being counterbalanced by a spring 27 and being locked in adjusted position by means of a clamp 28 carried by an upright 29 rising from the base 15.

The wrapping material, preferably in the form of a continuous strip S of paper, is supplied from a roll 30 supported by a reel or spindle 31 carried by the yoke 16. Said paper passes from the roll 30 over a tension device 32, thence through the folding device 33, and thence over a guide plate 34 to the shuttle 20. Said shuttle 20 comprises an annulus having on one face a circular series of rollers 35 about which the strip S is wrapped when the shuttle is rotated, said strip being fed from the shuttle about a guide roller 36 to the work W. Between the shuttle 20 and the source of supply 30 there is provided a cutting mechanism comprising a knife 37 cooperating with a portion of the guide plate 34 to sever the strip S when a sufficient length thereof has been wound around the shuttle rollers 35 to complete the wrapping of the work W. The knife 37 is automatically actuated, after a predetermined number of rotations of the driving disk 21, by a counting mechanism 38 actuated at each rotation of said driving disk by a cam projection 39 thereon, said counting mechanism being manually adjustable in accordance with the size of the articles wrapped.

From the foregoing, the nature, location, and function of the several parts referred to will be sufficiently understood for the purposes of the present case. Except in so far as they enter into combination with the parts hereinafter described, and as pointed out in the claims, these parts are not involved in the present invention and may be of any suitable construction and arrangement.

In a preferred form of a machine of the type above described, the shaft 40 of the motor 23 has fast thereon a driving member in the form of a disk 41 adapted to engage and actuate the driving disk 21. Said motor 23 is mounted on a carriage 42 vertically movable to engage and disengage the driving members 41 and 21 by means of a lever 43 pivoted to the base 15 and connected by a link 44 with the starting treadle 22, the vertical movements of the carriage 42 being guided by a parallel link mechanism 45.

In accordance with the present invention, the beads B of the tire shoe W are closed by a pair of pressers 46 located respectively on opposite sides of said shoe and carried respectively by parallel slides 47 guided in suitable ways formed at the top of an upright 48 rising from the base 15. The slides 47 are in the form of rack bars engaged respectively by a pinion 49 rotatably mounted on the upright 48, whereby the slides 47 and pressers 46 are connected for simultaneous movement in opposite directions. One of the slides 47 has attached thereto one end of a chain or other flexible connector 50 which passes over guide sheaves 51 on the upright 29 and the opposite end of which is attached to an arm 52 fast on a shaft 53 journalled in the base 15 and to which the starting treadle 22 is keyed or otherwise secured. The arrangement is such that when the starting treadle 22 is depressed to lift the motor 23 and start the machine, the pressers 46 will be moved toward one another to close the tire beads.

Between the guide sheaves 51, the chain 50 passes about an idler 54 journalled in a swinging arm 55 pivoted to the upright 29 coaxially with one of the sheaves 51 and having a lateral extension 56 formed with an angular end 57 which is engaged by a stud 58 on the shuttle yoke 16. When said shuttle yoke is adjusted in accordance with the size of the tire to be wrapped, as above explained, engagement of the stud 58 with the angular end 57 causes the arm 55 to be swung more or less on its pivot and the idler 54 to deflect the chain 50 to a greater or less extent, thereby automatically positioning the pressers 46 in accordance with the size of the work.

Certain features shown and referred to herein are covered by claims of other applications for Letters Patent as follows:—

As to the machine as a whole, application Ser. No. 479,410, above referred to;

As to the driving mechanism, application Ser. No. 637,655, filed May 9, 1923, by Jasper Derry, Philip O. Tengberg and myself;

As to the paper folder Serial No. 637,656, filed May 9, 1923, by Jasper Derry and myself;

As to the means for supporting and adjusting the shuttle-carrying yoke, Serial No. 637,657, filed May 9, 1923, by Jasper Derry and myself; and As to the work supporting rollers and associated parts, Serial No. 637,658 filed May 9, 1923 by me.

Having thus described my invention, I claim:—

1. In a machine for wrapping tire shoes, mechanism for forcing the beads of a shoe together as said shoe is wrapped comprising, in combination, pressers located respectively at opposite sides of said shoe, rack bars by which said pressers are carried, a pinion connecting said rack bars, and means for operating said rack bars.

2. In a machine for wrapping tire shoes, the combination with wrapping mechanism, means for actuating the same, and a starting treadle for controlling the operative connection of said wrapping mechanism with said actuating means, of mechanism for forcing the beads of a shoe together as said shoe is wrapped, and a flexible connector connecting said last named mechanism with said starting treadle.

3. In a machine for wrapping tire shoes, in combination with wrapping mechanism, means for actuating the same and a starting treadle for controlling the operative connection of said wrapping mechanism with said actuating means, of pressers located respectively at opposite sides of a shoe wrapped by said wrapping mechanism, slides by which said pressers are carried, means for causing simultaneous movement of said slides in opposite directions and a flexible connector connecting one of said slides with said starting treadle.

4. In a machine for wrapping tire shoes, the combination with mechanism for supporting and wrapping a shoe, said mechanism being adjustable for shoes of various sizes, of mechanism for closing the beads of said shoe, and means for automatically adjusting said bead closing mechanism when said wrapping mechanism is adjusted.

5. In a machine for wrapping tire shoes, in combination, means for supporting and rotating a shoe, a rotatable annular shuttle through which said shoe is moved as it is rotated, an adjustable shuttle supporting yoke, mechanism for closing the beads of said shoe, and means for automatically adjusting said bead closing means when said yoke is adjusted.

6. In a machine for wrapping tire shoes, the combination with mechanism for supporting and wrapping a shoe, said mechanism having a part adjustable for shoes of varying sizes, of mechanism for closing the beads of said shoe, a flexible connector for operating said bead closing mechanism, and an idler carried by the adjustable part of said wrapping mechanism and about which said flexible connector passes.

7. In a machine for wrapping tire shoes, in combination with mechanism for supporting and wrapping a shoe, said mechanism having a part adjustable for shoes of varying sizes, of pressers located respectively at opposite sides of said shoe, slides by which said pressers are carried, means for causing simultaneous movement of said slides in opposite directions, a flexible connector for operating one of said slides and an idler carried by the adjustable part of said wrapping mechanism and about which said flexible connector passes.

8. In a machine for wrapping tire shoes, in combination with wrapping mechanism having a part adjustable for shoes of varying sizes, means for actuating said wrapping mechanism and a starting treadle for controlling the operative connection of said wrapping mechanism with said actuating means, of mechanism for closing the beads of said shoe, a flexible connector connecting said bead closing mechanism with said starting treadle and an idler carried by the adjustable part of said wrapping mechanism and about which said flexible connector passes.

9. In a machine for wrapping tire shoes, in combination, means for supporting and rotating the shoe, a rotatable annular shuttle through which said shoe is moved and rotated, an adjustable shuttle supporting a yoke, mechanism for closing the beads of said shoe, a flexible connector for operating said bead closing mechanism and an idler carried by said shoe and about which said flexible connector passes.

10. In a machine of the class described, in combination, means for supporting a tire shoe, an annular shuttle movable about its center and through which said shoe is adapted to be moved about its center, means for supplying a strip of wrapping material to said shuttle as it is rotated, an adjustable support for said shuttle, and mechanism connected to said shuttle support and positioned thereby for forcing the beads of said shoe together during the wrapping operation.

11. In a machine of the class described, in combination, mechanism for supporting and wrapping a tire shoe, pressers on opposite sides of said shoe respectively and adapted to bear against the beaded edges thereof, slides by which said pressers are carried; means for causing simultaneous movement of said slides in opposite directions, an operating lever, and a connection between said operating lever and one of said slides.

12. In a machine of the class described, in combination, mechanism for supporting and wrapping a tire shoe, pressers on opposite sides of said shoe respectively and adapted to bear against the beaded edges thereof, rack bars by which said pressers are carried, a pinion connecting said rack bars for causing simultaneous movement thereof in opposite directions, an operating lever, and a connection between said operating lever and one of said rack bars.

In testimony whereof I affix my signature.

GEORGE W. PROUTY.